(12) United States Patent
Denney

(10) Patent No.: US 8,766,140 B2
(45) Date of Patent: Jul. 1, 2014

(54) APPARATUS AND METHOD FOR LASER CLEANING OF COATED MATERIALS PRIOR TO WELDING

(75) Inventor: Paul Edward Denney, Bay Village, OH (US)

(73) Assignee: Lincoln Global, Inc., City of Industry, CA (US)

( * ) Notice: Subject to any disclaimer, the term of this patent is extended or adjusted under 35 U.S.C. 154(b) by 447 days.

(21) Appl. No.: 13/267,641

(22) Filed: Oct. 6, 2011

(65) Prior Publication Data

US 2013/0087534 A1 Apr. 11, 2013

(51) Int. Cl.
*B23K 9/235* (2006.01)
*B23K 26/36* (2014.01)

(52) U.S. Cl.
USPC .......... 219/136; 219/137 R; 219/121.68; 219/121.69; 228/176; 228/203; 228/18

(58) Field of Classification Search
CPC ....... B23K 9/235; B23K 26/36; B23K 26/365
USPC ........ 219/136, 137 R, 121.6, 121.85, 121.68, 219/121.69; 228/164, 176, 203, 205, 18
See application file for complete search history.

(56) References Cited

U.S. PATENT DOCUMENTS

| 3,634,650 A | 1/1972 | Nomura |
| 5,859,402 A * | 1/1999 | Maier ................. 219/121.64 |
| 6,168,853 B1 | 1/2001 | Feng et al. |

FOREIGN PATENT DOCUMENTS

| CH | 593757 A5 | 12/1977 |
| DE | 10315976 A1 | 10/2004 |
| GB | 2274257 A | 7/1994 |
| GB | 2274257 A * | 7/1994 |
| JP | S61165281 A | 7/1986 |
| JP | 10225770 A * | 8/1998 |
| JP | 10225770 A | 8/1998 |
| JP | 2004298903 A | 10/2004 |
| JP | 2006021224 A | 1/2006 |
| WO | 9529033 A1 | 11/1995 |

OTHER PUBLICATIONS

ISR and Written Opinion dated May 7, 2013.

* cited by examiner

*Primary Examiner* — Samuel M Heinrich
(74) *Attorney, Agent, or Firm* — Perkins Coie LLP

(57) ABSTRACT

A system and method is provided where a coated work piece is welded at high speeds with minimal porosity and spatter. The coating on the work piece is removed or ablated by a high energy heat source prior to being welded in a welding operation, such that high welding speeds are attained. The high energy heat source is positioned upstream of the welding operation to vaporize any surface coatings on a work piece.

20 Claims, 11 Drawing Sheets

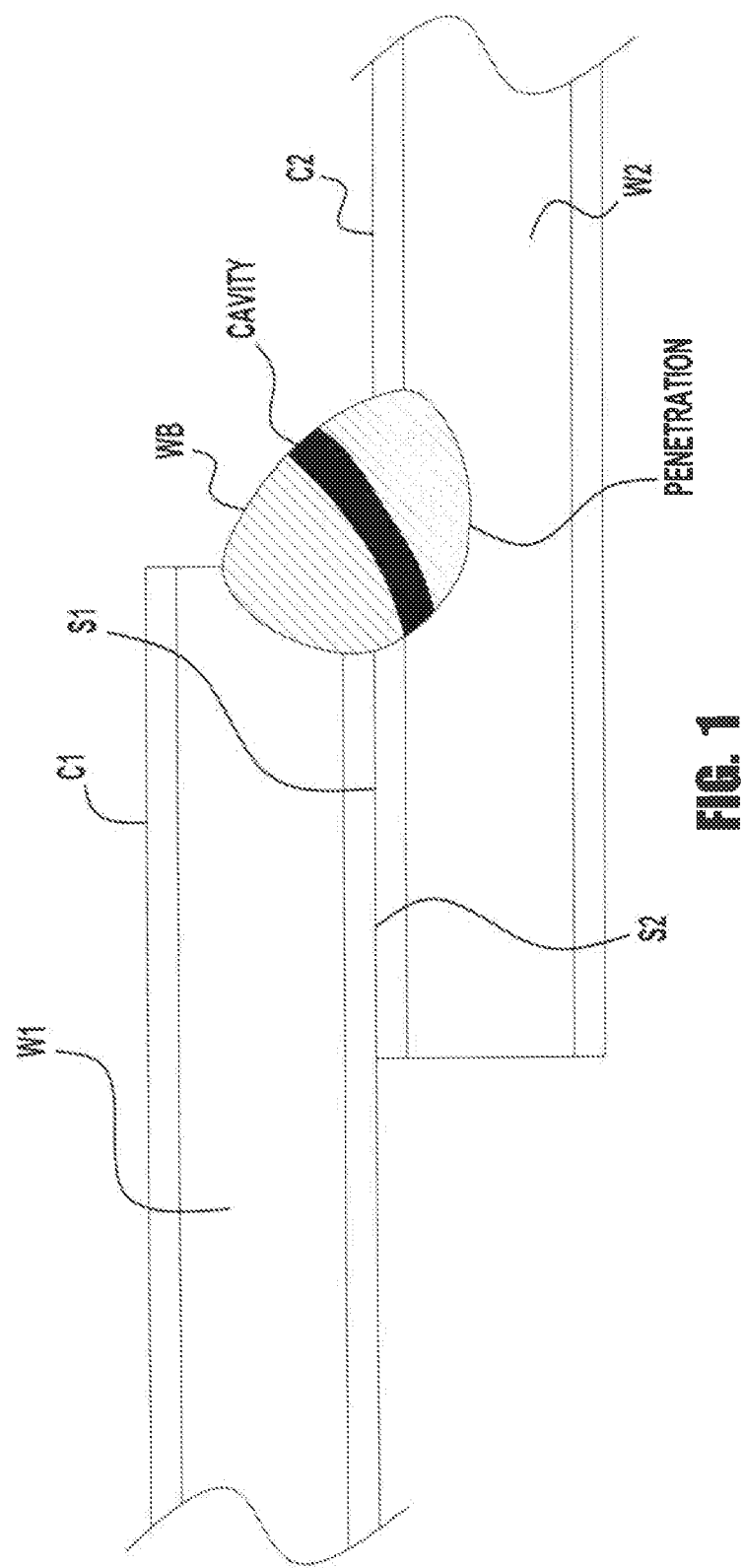

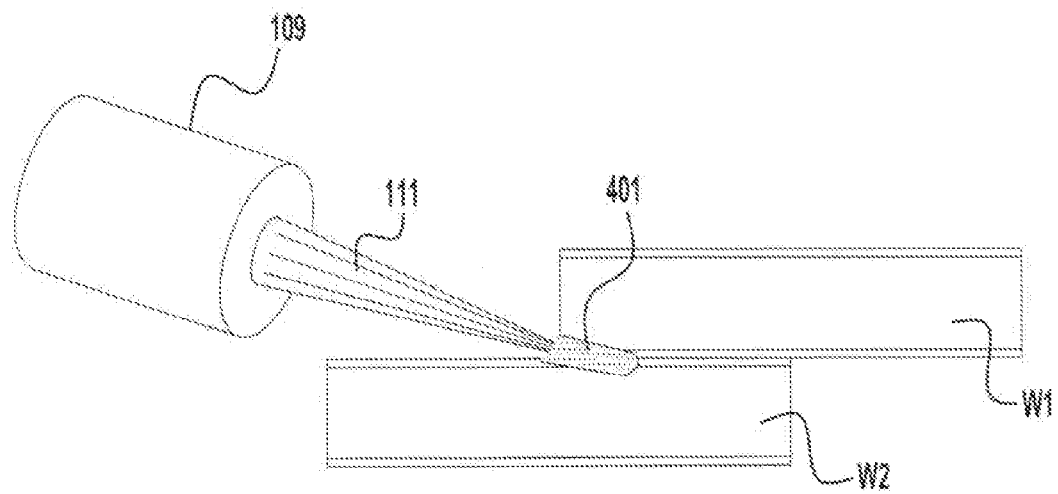
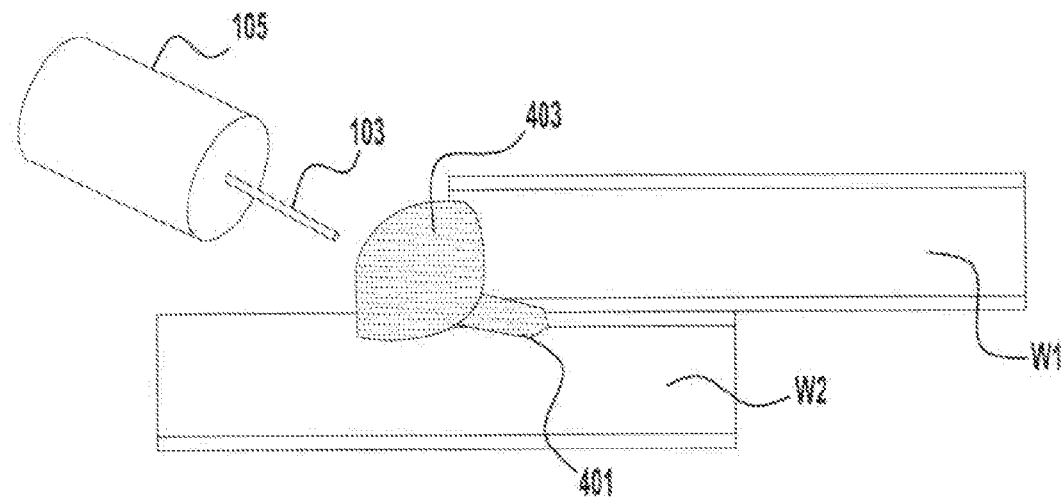
FIG. 4

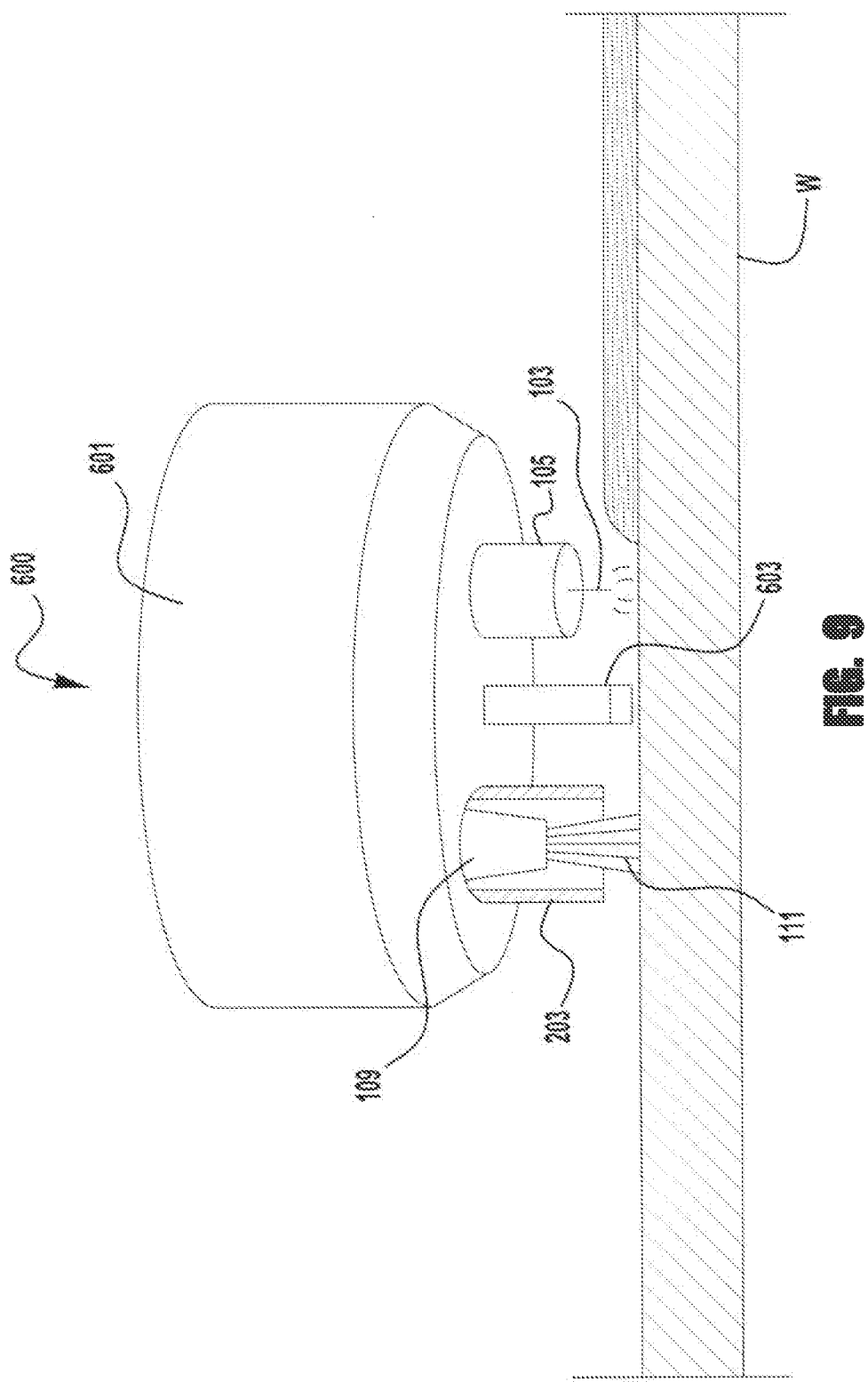

APPARATUS AND METHOD FOR LASER CLEANING OF COATED MATERIALS PRIOR TO WELDING

BACKGROUND OF THE INVENTION

1. Field of the Invention

Systems and methods of the present invention relate to welding and joining, and more specifically to the welding and joining of coated materials.

2. Description of the Related Art

Many welded structures are used in environments which require surface coatings to prevent corrosion. For example, the deposition of zinc on steel (through galvanization or galvannealing) is commonly used to protect the steel from corrosion when the steel is exposed to the environment. It is very difficult to galvanize materials after they are welded in place and as such most steel components are galvanized prior to welding. However, welding coated materials can be a difficult process because the coating can interfere with the welding process and degrade the quality of the weld. For example, the zinc in galvanization is vaporized because of the heat of a welding arc and this vaporization can cause significant spatter or can be trapped in the weld puddle causing porosity in the weld. Because of this the welding of coated materials is considerably slower than welding uncoated materials.

BRIEF SUMMARY OF THE INVENTION

Embodiments of the present invention include equipment and methods of welding where a high energy beam is directed to a coated surface of a work piece to be welded, where the coated surface has a coating with a different composition than the work piece. At least a portion of the coating is ablated with the high energy beam to remove at least some of the coating, where the ablation does not substantially melt the work piece. The work piece is then welded with an arc welding process such that a weld joint created which has a cross-sectional porosity in the range of 0 to 30%, a length porosity in the range of 0 to 30% and a spatter factor in the range of 0 to 3, where spatter factor is the ratio of weld spatter weight in mg over consumed filler metal weight in kg for a length of said weld joint.

BRIEF DESCRIPTION OF THE DRAWINGS

The above and/or other aspects of the invention will be more apparent by describing in detail exemplary embodiments of the invention with reference to the accompanying drawings, in which:

FIG. 1 is a diagrammatical representation of a weld joint made from an arc welding process;

FIG. 4 is a diagrammatical representation of a further exemplary embodiment of a weld joint made according to an embodiment of the present invention;

FIG. 9 is a diagrammatical representation of an integral welding head unit in accordance with an exemplary embodiment of the present invention.

DETAILED DESCRIPTION OF EXEMPLARY EMBODIMENTS

Figure 2A:
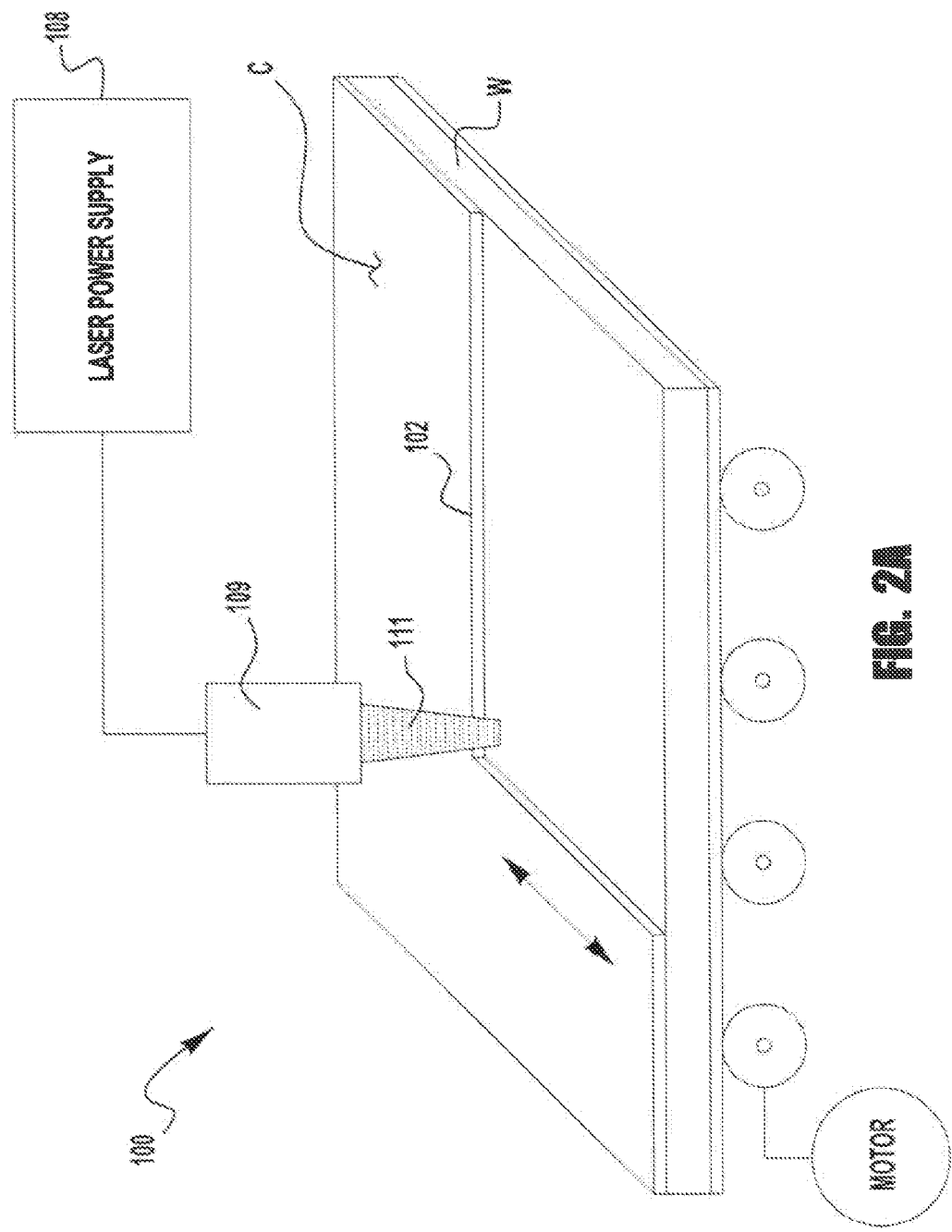
FIGS. 2A to 2C are diagrammatical representations of a cleaning operation in accordance with exemplary embodiments of the present invention.

Exemplary embodiments of the invention will now be described below by reference to the attached Figures. The described exemplary embodiments are intended to assist the understanding of the invention, and are not intended to limit the scope of the invention in any way. Like reference numerals refer to like elements throughout.

FIG. 1 depicts a typical welded lap joint where a first work piece W1 is placed partially on top of a second work piece W2 and the two are welded with a weld bead WB. In the welding industry, this type of connection is commonly referred to as a lap joint. Lap joints are common in the automotive industry. In addition to lap joints, embodiments of the present invention can weld multiple different types of joints as well, including: fillet joints, joggle joints, butt joints, etc. As shown in FIG. 1, at least one of the work pieces has a coating C1/C2 on the surfaces to be welded, where the coatings have a different material composition than the work piece. As an example, this coating can be corrosion resistant coating, such as galvanization. Because the work pieces are coated the surfaces of the work pieces which contact each other S1 and S2 also have coatings on them. During welding the heat of the welding arc plasma vaporizes the coatings C1/C2. The vaporized coatings C1/C2 which are not covered by the overlapping of the work pieces typically is removed from the weld zone either by fume extraction or simply dissipates such that the vapor does not interfere with the weld. However, the coatings C1/C2 which are on the contact surfaces S1/S2 are also vaporized because of the typical depth of penetration by the weld bead WB. However, the vaporized coatings from the contact surfaces S1/S2 are distant from the surface of the weld puddle during welding and as such must travel through the molten puddle to try to escape the weld puddle before the bead solidifies. However, if the welding speed is too fast the puddle solidifies before the vaporized coatings can escape. This leads to porosity in the weld bead. This porosity can be especially bad when a bubble leaves a trail in the weld puddle which does not close behind the bubble. The cavities created by escaping vaporized coatings can significantly degrade the quality of a weld.

Because of these issues with porosity, the welding of coated work pieces must be significantly slowed, as compared to the welding of non-coated work pieces. The slow pace can provide sufficient time for the vaporized coatings to escape the molten weld puddle. However, these slow speeds tend to increase the heat input into the weld and diminish the overall speed and efficiency of the welding operation. For example, when welding galvanized steel the typical travel speeds are 15 to 25 in/min, for work pieces having a thickness of around 1/16 in (16 gauge). Alternatively, welders have often had to grind or sand the coating off of the work piece, which are also time consuming and labor intensive operations.

As discussed earlier, a common coating is galvanization for corrosion resistance. However, other coatings which can cause similar issues include, but are not limited to: paint, stamping lubricants, glass linings, aluminized coatings, surface heat treatment, nitriding or carbonizing treatments, cladding treatments, or other vaporizing coatings or materials.

Figure 2B:
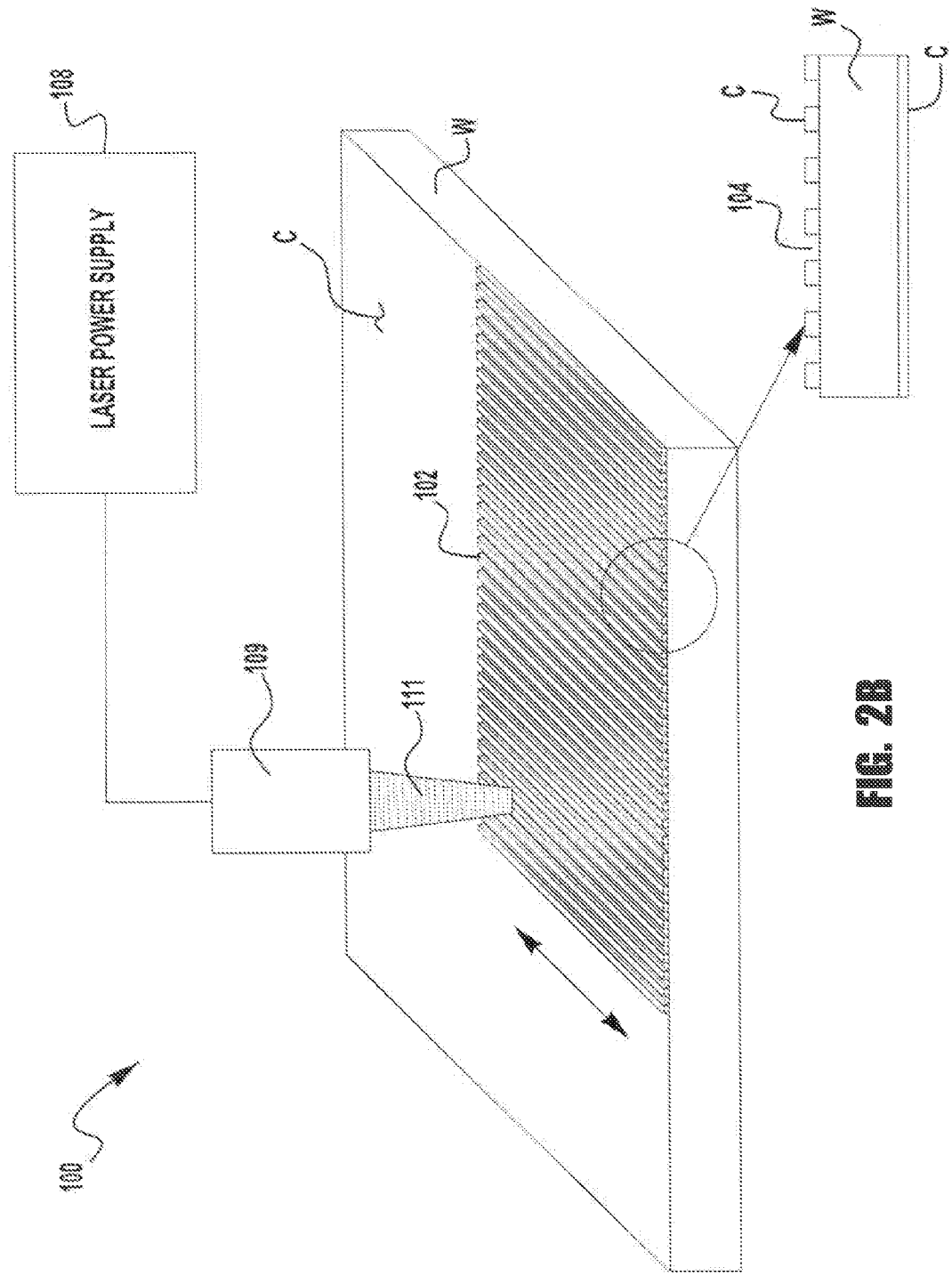
Figure 2C:
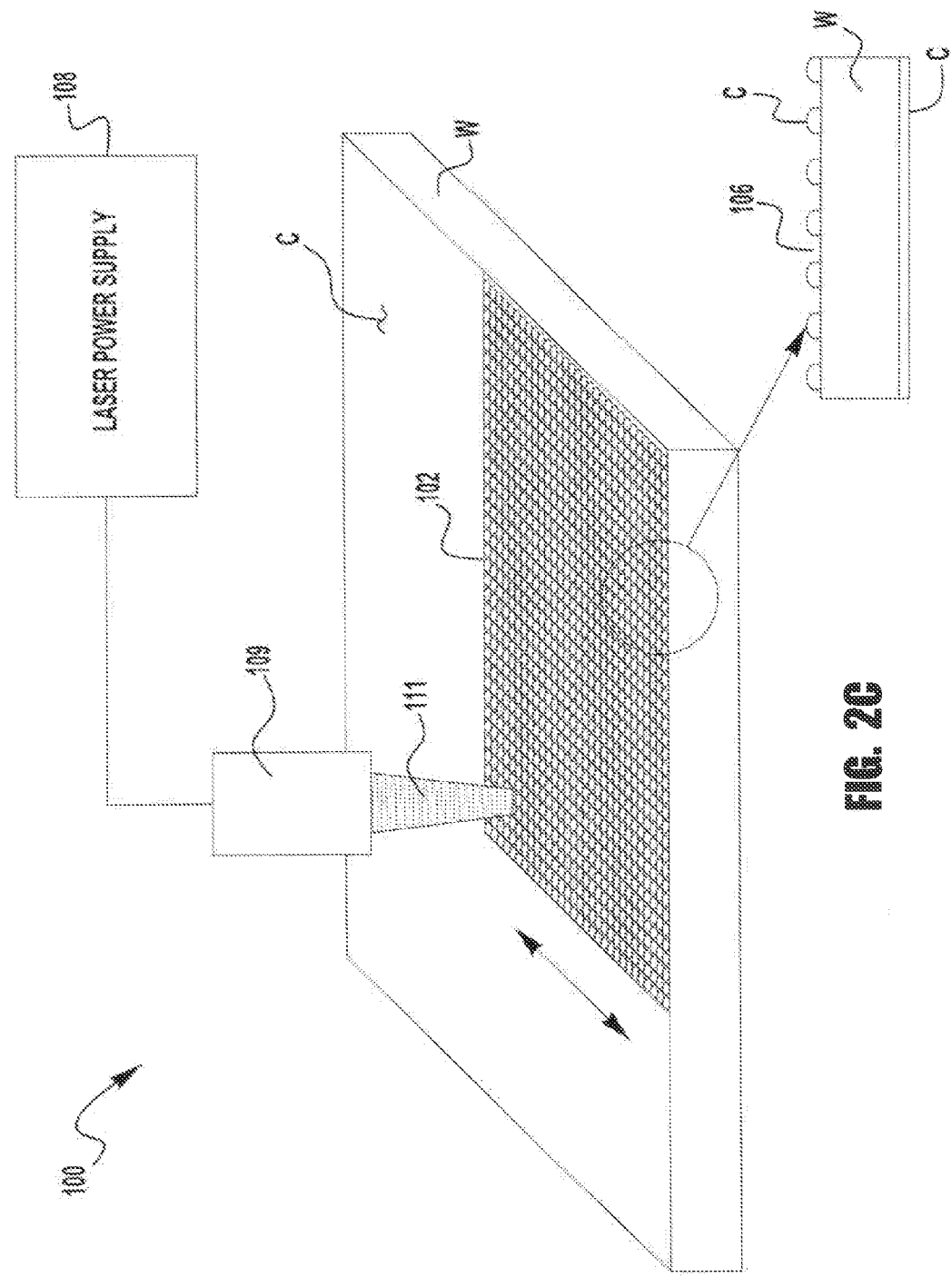

FIGS. 2A through 2C depict an exemplary embodiment of a cleaning system 100 which uses a power supply 108 and a high energy heat source 109 to direct a beam 111 at a surface of a work piece W to ablate the coating C off of an ablation zone 102. The ablation zone 102 is the area on which a subsequent weld will be placed, and is generally defined by a rectangular area which encompasses the travel length and width of the beam 111 on the surface of the work piece W. In exemplary embodiments of the present invention the heat source is a laser 109 (as shown in the Figures). However, other embodiments are not limited to using a laser, and other types of heat sources can be used. Furthermore, many different types of lasers can be used and because of the relatively low temperature requirements to ablate or remove a coating, it is not necessary to use very high energy lasers or heat sources. Such laser/heat source systems (including the heat source 109 and power supply 108) are known and need not be described in detail herein.

In exemplary embodiments, the energy density and focus of the beam 111 should not be too high so as to substantially melt the underlying work piece W, as such melting may interfere with the arc welding process. In exemplary embodiments of the present invention, a laser 109 having a power level of 10 W to 10 kW can be used. In other exemplary embodiments, the laser beam 111 is to have a power density of at least $10^5$ W/cm$^2$ and interaction times of no more than 5 ms. In some embodiments the interaction times should be in the range of 1 to 5 ms. The intensity and the interaction times of the laser (or heat source) should be such that appreciable melting of the base material should be avoided. Because the heat required to ablate or remove the coatings are not typically high, this cleaning process will not affect the heat affected zone of a weld joint any more than the welding process itself. The laser can be any known type of laser, including but not limited to carbon dioxide, Nd:YAG, Yb-disk, YB-fiber, fiber delivered or direct diode laser systems. Further, even white light or quartz laser type systems can be used if they have sufficient energy. Other embodiments of the system may use other types of high energy sources which are capable of vaporizing the coatings on the surface of the work piece and can include at least one of an electron beam, a plasma arc welding subsystem, a gas tungsten arc welding subsystem, a gas metal arc welding subsystem, a flux cored arc welding subsystem, and a submerged arc welding subsystem serving as the high intensity energy source. However, if higher energy sources are used their energy density and heat must be controlled so as to only vaporize at least a portion of the coating but not substantially melt or scar the underlying work piece.

The lasers employed in embodiments of the present invention can be, but are not limited to: continuous wave, pulsed, q-switched, or other types of lasers that have sufficient peak powers and energy densities to perform the desired cleaning operation. The beam 11 from the laser 109 can be controlled by optics or the power supply 108 to produce a beam cross-section which can be round, rectangular, square, elliptical or other desired shapes. Further, beam splitters can be employed to produce multiple beams or impact spots on the surface. The beam can also be scanned or otherwise manipulated to produce the desired power distribution on the surface for a given interaction time to achieve the desired cleaning.

During ablation, the heat source 109 is powered by the power supply 108 and emits a beam 111 at the surface. It is noted that throughout this application the heat source 109 will also be referred to as a "laser", but as stated above embodiments of the present invention are not limited to the use of only a laser, but "laser" is used as a discussion of only an exemplary embodiment. During removal the laser 109 emits a beam 111 which impinges on the surface of the work piece to ablate or remove the coating C. As shown in FIG. 2A the beam 111 removes the entire coating C from the surface of the work piece in the ablation zone 102, but does not substantially melt the work piece—which means that no molten puddle of the work piece material is created on the surface of the work piece. The width and the length of the ablation zone 102 are a function of the weld to be performed, and the removal of the coating can occur any time prior to welding.

As shown in FIG. 2A the beam 111 is oscillated back and forth across the ablation zone 102 during the removal process, while the work piece is moved in a travel direction by a motor. However, embodiments of the present invention are not limited in this regard as the laser can be moved in a travel direction while the work piece remains stationary. Further, in other embodiments the beam 111 does not have to be translated. For example, the beam 111 can have a width at the surface such that it ablates the entire width of the ablation zone without having to oscillate. Embodiments of the present invention are not limited in this regard.

In further embodiments of the present invention, it is not required that the beam 111 remove the entire thickness of the coating C. In some welding operations it may only be necessary to remove a partial amount of the coating to achieve an acceptable weld. For example, in some welding operations a minimal level of porosity is acceptable. As such, the speed the process it may only be necessary to ablate up to 50% of the thickness of the coating on the work piece W. In other exemplary embodiments, it may require up to 75% of the thickness of the coating to be ablated.

As shown in FIGS. 2B and 2C, in some exemplary embodiments it is not necessary to ablate the entire area of the ablation zone 102 with the beam. As stated above, some welding operations will produce acceptable weld beads with a minimal level of porosity. Because of this it may not be necessary to remove all of the coating C in the area 102. Thus, in some exemplary embodiments of the present invention, the laser 109 and beam 111 can remove an area of coating C which is less than the overall ablation area 102. As shown in FIG. 2B the beam 111 removes the coating such that cavities 104 (in the shape of grooves) are created in the coating C. In this embodiment the overall cleaning operation is faster than removing all of the coating C. Furthermore, the creation of grooves 104 in the coating can aid in facilitating the removal of vaporized coating from the weld zone during welding. Specifically, as shown in FIG. 2B the grooves can extend to an end of the work piece W, such that when another work piece is placed on the work piece W for welding, the grooves will form cavities between the two work pieces. These cavities provide an exit path for the vaporized coating so that a minimal amount of vaporized coating will enter or try to pass through the weld puddle. Thus, by creation grooves or cavities on the coating C the overall ablation process can be quicker (because less material is being removed) while still permitting high speed and low porosity welds. In exemplary embodiments of the present invention, the beam 111 removes coating C from at least 40% of the area of the ablation zone 102. In other exemplary embodiments, the beam 111 removes coating C from at least 65% of the area of the ablation zone 102.

FIG. 2C depicts another embodiment where the beam 111 cavities 106 in the coating C on the weld surface of the work piece W. The cavities 106 can be of any shape or size to aid in reducing the amount of vaporized coating which enters or tries to pass through the weld puddle to escape.

Figure 3A:
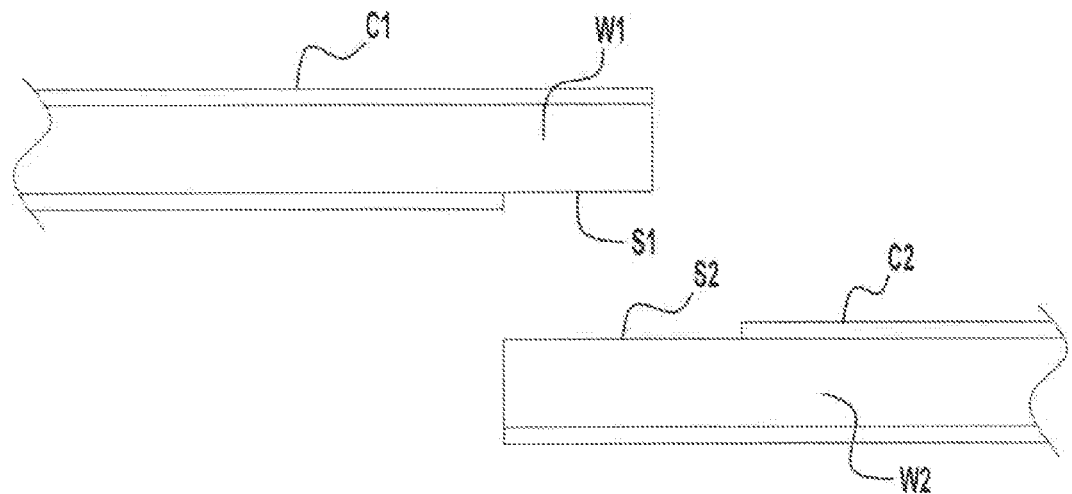
FIG. 3A to 3B are diagrammatical representations of weld joint made in accordance with an exemplary embodiment of the present invention.
Figure 3B:
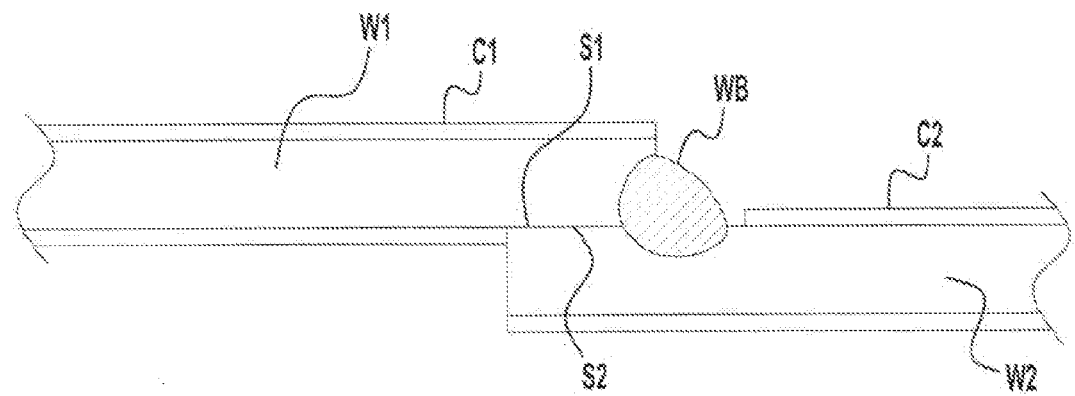

FIGS. 3A and 3B depict work pieces W1 and W2 after the coating has been removed in accordance with embodiments of the present invention. As can be seen the surfaces S1 and S2 not longer have the full/original amount of coating in the weld zone. In these figures the full amount of coating C1/C2 has been removed, but as described above, the full removal may not be necessary in some embodiments. When these work pieces are now welded (FIG. 3B) the penetration of the weld bead does not create vaporized coating material, and thus allows for the speed of the welding operation to be increased, without increasing spatter or porosity. For example, embodiments of the present invention can achieve welding speeds on coated steel materials having a thickness in the range of 1/16" to 3/16" of at least 50 in/min with the porosity and spatter levels described above. In some embodiments, the speed is in the range of 50 to 100 in/min, and in other embodiments the speed is in the range of 70 to 100 in/min. In some embodiments these speeds can be achieved while removing the coating and welding at the same time.

In the embodiments discussed above, the work pieces are cleaned by the laser 109 at some point prior to the welding operation. This cleaning operation can occur at a separate work station than the welding operation, but can also occur in line with a weld station to increase operational efficiency. Furthermore, the cleaning can occur simultaneously with the welding operation.

The above embodiments have discussed removal and/or ablation of a surface coating on a work piece W. However, other embodiments of the present invention can used the laser 109 and beam 111 to modify properties or chemical composition of the coating prior to welding. In some embodiments it may not be necessary to remove or ablate the coating, but to alter its composition or change its properties. For example, it is known that the hydrocarbons in paint can interfere with the arc welding process, while the other components of paint are not as problematic. As such, the laser 109 and beam 111 can be used to burn off the hydrocarbons from the paint, thus changing its composition, while the overall thickness of the paint may remain substantially the same as prior to ablation. Thus, other embodiments can be used to alter the properties or composition of the coating, rather than removing it. Of course, this process can be employed using similar characteristics, properties, procedures and equipment as described herein for removal of coatings.

FIG. 4 depicts a welding operation in which the coating(s) are irradiated immediately prior to welding of the joint. Specifically, in the upper figure a beam 111 is directed at the joint such that beam 111 penetrates into the joint to vaporize/remove at least some of the coatings on the work pieces W1/W2. In some embodiments, during this process a laser weld bead 401 can be created which is created by the melting of portions of each of the work pieces W1 and W2. Of course, the depth of penetration of the beam 111 should be controlled such that the work pieces are not structurally compromised. Because the coatings in this region will be vaporized during irradiation, at least some porosity may be present in the bead 401. However, in this embodiment, immediately following the beam irradiation an arc welding operation is conducted at the joint (lower figure). The process of arc welding creates an arc welding bead 403 which consumes at least some of the laser weld bead 401 and because of this subsequent arc welding operation, to the extent any porosity existing the beam weld bead 401 that porosity will have escaped through the arc weld bead 403. Thus, in some exemplary embodiments, the laser cleaning and arc welding can occur at the same time. Such embodiments can significantly improve the efficiency of the welding operation.

In any of the embodiments discussed above, because the laser 109 is removing almost all or all of the coating from the surface, embodiments of the present invention can achieve welding speeds which previously could not have been achieved when welding coated materials. For example, embodiments of the present invention can achieve welding speeds of coated materials at speeds reaching that of uncoated materials. Because arc welding systems are generally known, such stand alone systems need not be depicted or explained herein.

Further, not only can higher weld speeds be achieved, but they can be achieved with minimal levels of porosity and spatter. Porosity of a weld can be determined by examining a cross-section and/or a length of the weld bead to identify porosity ratios. The cross-section porosity ratio is the total area of porosity in a given cross-section over the total cross-sectional area of the weld joint at that point. The length porosity ratio is the total accumulated length of pores in a given unit length of weld joint. Embodiments of the present invention can achieve the above described travel speeds with a cross-sectional porosity between 0 and 30%. Thus, a weld bead with no bubbles or cavities will have 0% porosity. In other exemplary embodiments, the cross-sectional porosity can be in the range of 5 to 20%, and in another exemplary embodiment can be in the range of 0 to 10%. It is understood that in some welding applications some level of porosity is acceptable. Further, in exemplary embodiments of the invention the length porosity of the weld is in the range of 0 to 30%, and can be 5 to 20%. In further exemplary embodiments the length porosity ratio is in the range of 0 to 10%. Thus, for example, welds can be produced in coated materials that have a cross-sectional porosity in the range of 0 to 10% and a length porosity ratio of 0 to 10%.

Furthermore, embodiments of the present invention can weld at the above identified travel speeds with little or no spatter over prior methods of welding coated materials (with the coating in place during welding). Spatter occurs when droplets of the weld puddle are caused to spatter outside of the weld zone. When weld spatter occurs it can compromise the quality of the weld and can cause production delays as it must be typically cleaned off of the work pieces after the welding process. Thus, there is great benefit to welding at high speed with no spatter. Embodiments of the present invention are capable of welding at the above high travel speeds with a spatter factor in the range of 0 to 3, where the spatter factor is the weight of the spatter over a given travel distance X (in mg) over the weight of the consumed filler wire 140 over the same distance X (in Kg). That is:

Spatter Factor=(spatter weight(mg)/consumed filler wire weight(Kg))

The distance X should be a distance allowing for a representative sampling of the weld joint. That is, if the distance X is too short, e.g., 0.5 inches, it may not be representative of the weld. Thus, a weld joint with a spatter factor of 0 would have no spatter for the consumed filler wire over the distance X, and a weld with a spatter of factor of 2.5 had 5 mg of spatter for 2 Kg of consumed filler wire. In an exemplary embodiment of the present invention, the spatter factor is in the range of 0 to 3. In a further exemplary embodiment, the spatter factor is in the range of 0 to 1. In another exemplary embodiment of the present invention the spatter factor is in the range of 0 to 0.5. It should be noted that embodiments of the present invention can achieve the above described spatter factor ranges when welding coated materials where the coating remains on the work piece during the welding operation, while achieving high speeds normally achievable only on uncoated work pieces.

There are a number of methods to measure spatter for a weld joint. One method can include the use of a "spatter boat." For such a method a representative weld sample is placed in a container with a sufficient size to capture all, or almost all, of the spatter generated by a weld bead. The container or portions of the container—such as the top—can move with the weld process to ensure that the spatter is captured. Typically the boat is made from copper so the spatter does not stick to the surfaces. The representative weld is performed above the bottom of the container such that any spatter created during the weld will fall into the container. During the weld the amount of consumed filler wire is monitored. After the weld is completed the spatter boat is to be weighed by a device having sufficient accuracy to determine the difference, if any, between the pre-weld and post-weld weight of the container. This difference represents the weight of the spatter and is then divided by the amount, in Kg, of the consumed filler wire. Alternatively, if the spatter does not stick to the boat the spatter can be removed and weighed by itself.

Figure 5:
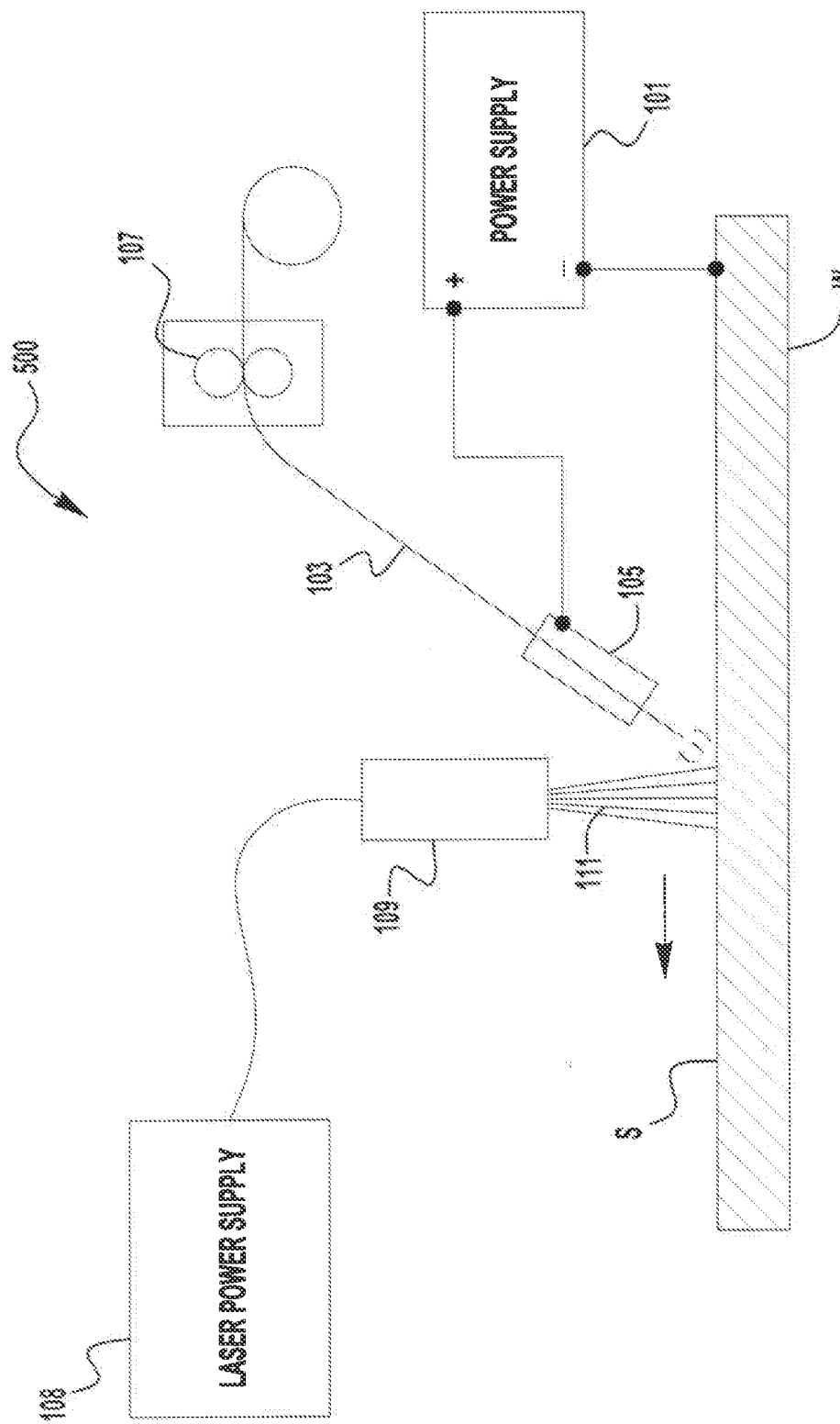
FIG. 5 is a diagrammatical representation of an exemplary embodiment of a welding system according to the present invention.

FIG. 5 depicts a welding system 500 in accordance with an exemplary embodiment of the present invention in which the cleaning and welding operation occurs simultaneously. Specifically, the system 500 contains a welding power supply 101 which supplies an arc welding waveform to an electrode 103. The electrode 103 is directed to a work piece W through a contact tip 105 via a wire feeding system 107. This arc welding system can be any known type of arc welding system, including but not limited to gas metal arc welding (GMAW). Not shown is an inert gas or fume extraction system which is often used in arc welding. The power supply 101 creates a welding arc between the electrode 103 and the work piece W such that the electrode 103 is deposited into a weld bead. As described above, the laser 109 irradiates the coating of the work piece W with a beam to remove or ablate the coating prior to welding. The energy level of the beam 111 is such that the there is no appreciable melting of the work piece W. The shape/cross-section of the beam 111 is to be as needed to provide sufficient ablation/removal of the coating prior to welding.

Figure 6:
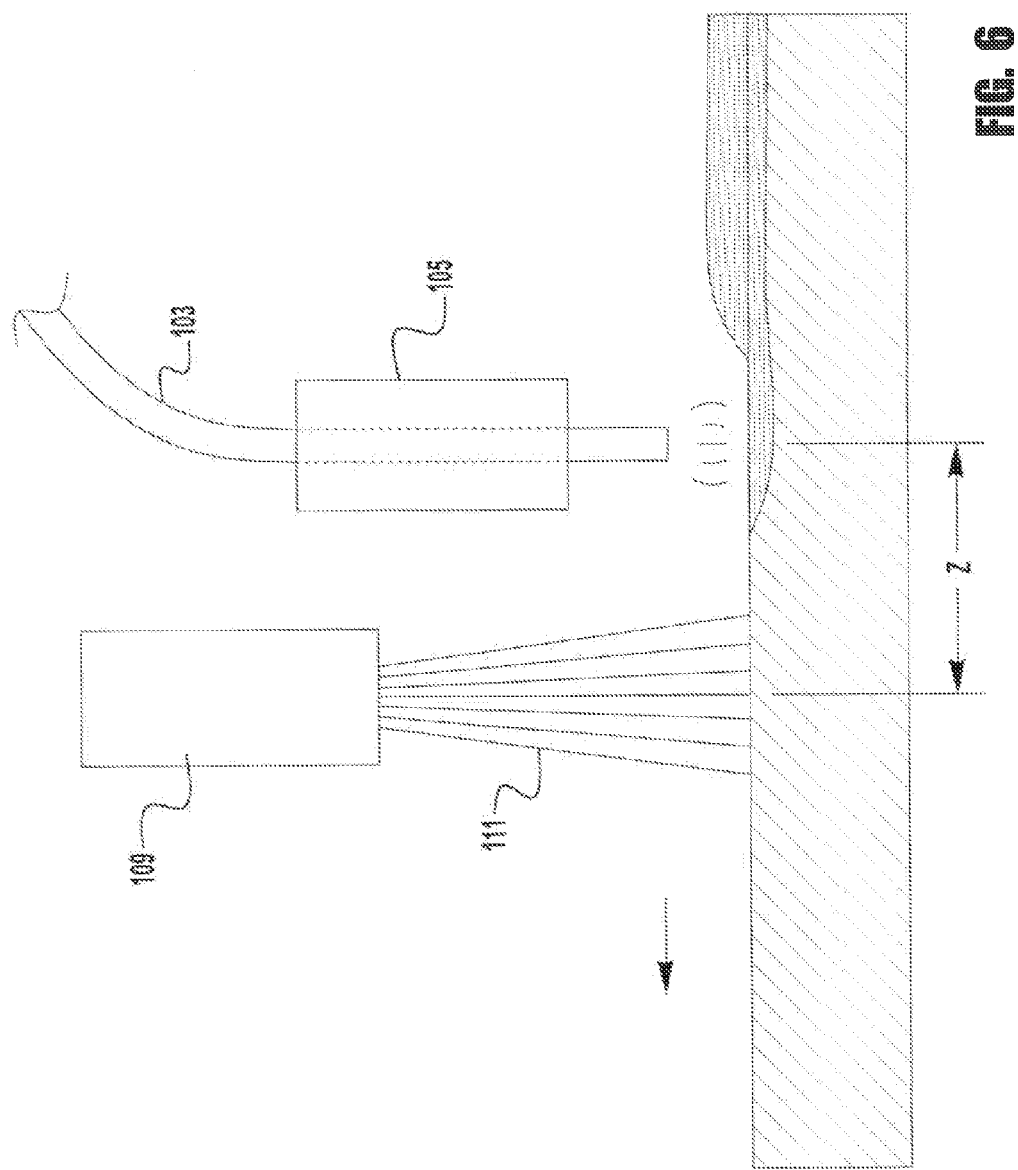
FIG. 6 is a diagrammatical representation of an exemplary embodiment of a portion of a welding system.

FIG. 6 depicts an aspect of the welding system in accordance with embodiments of the present invention. As shown, the arc welding occurs a distance Z behind the ablation operation. In exemplary embodiments of the present invention, the distance Z is in the range of 0.5 to 6 inches. In other exemplary embodiments, the distance Z is in the range of 0.5 to 3.5 inches. Of course, in other embodiments it is not required that the welding occur immediately after the ablation operation. In fact, the laser ablation can occur at another work station.

Figure 7:
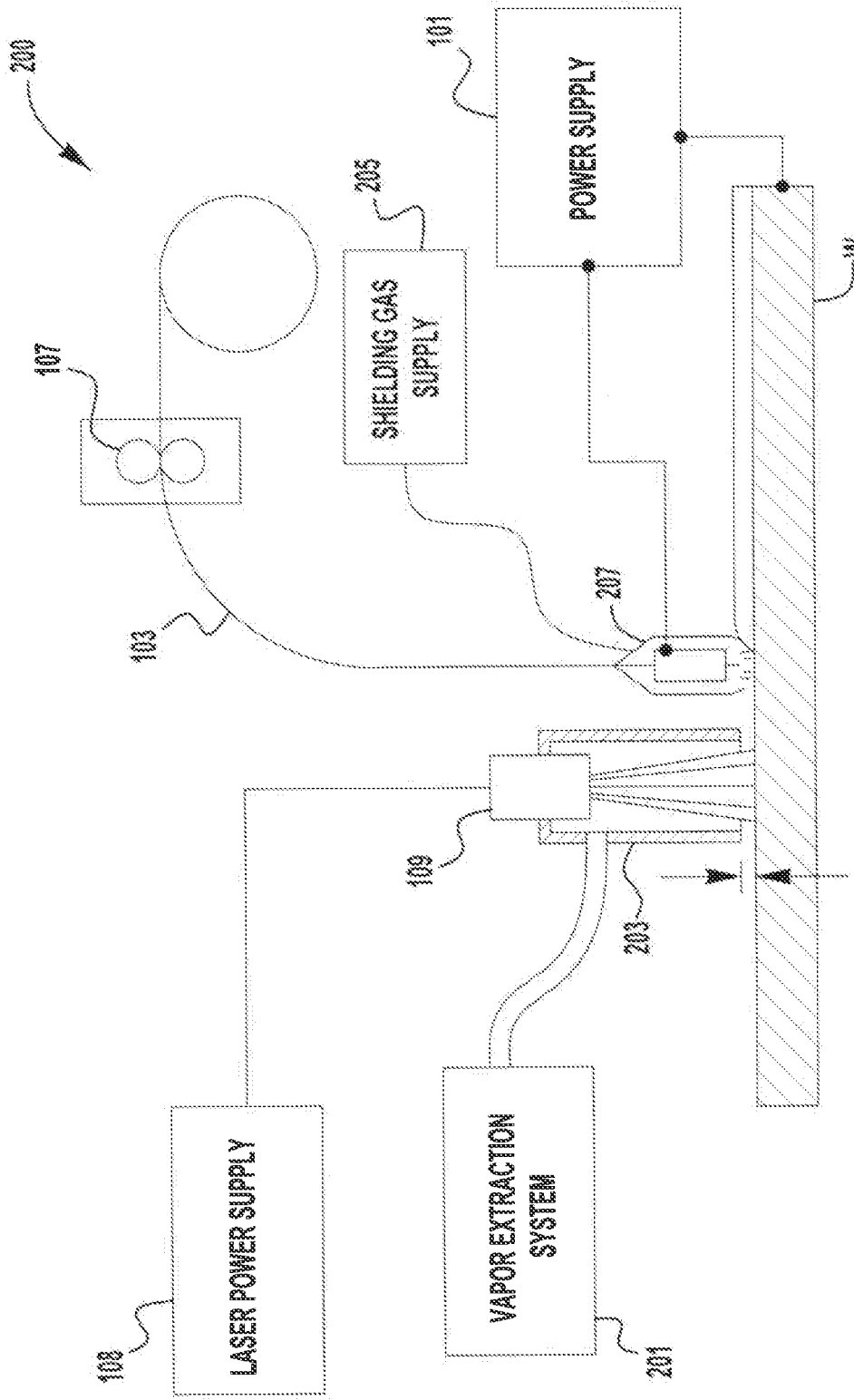
FIG. 7 is a diagrammatical representation of another exemplary embodiment of a welding system of the present invention.

FIG. 7 depicts another exemplary embodiment of a welding system 200 in accordance with the present invention. In this system 200 a vapor extraction system 201 and nozzle 203 are incorporated. The nozzle 203 is positioned such that it can remove any vaporized coating material from the weld zone. This will prevent the vapor from contaminating the weld or otherwise interfering with any shielding that may be needed for the welding operation. In the embodiment shown, the nozzle is coupled to the laser 109 such that the nozzle 203 shrouds the laser beam 111. In an exemplary embodiment, the end of the nozzle 203 is a distance X above the surface of the work piece in a range of 0.125 to 0.5 inches. The distance X should not interfere with the welding operation, but should be sufficient to remove at least some of the vaporized coating during ablation. Also shown in FIG. 4 is a shielding gas supply 205 and nozzle 207 to deliver the shielding gas to the weld. Such systems are generally known and will not be discussed in detail herein.

Figure 8:
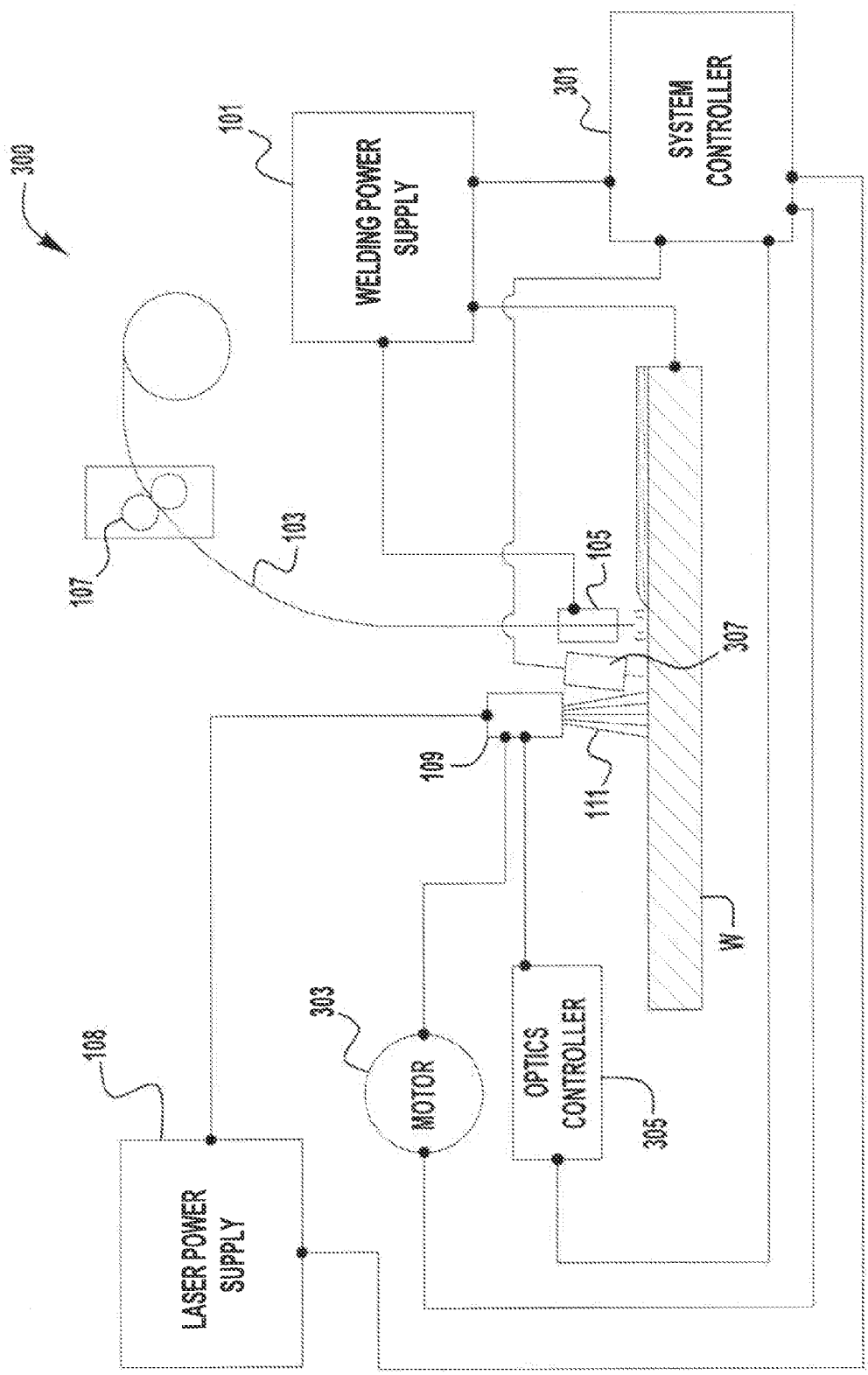
FIG. 8 is a diagrammatical representation of a further exemplary embodiment of a welding system of the present invention.

FIG. 8 depicts another exemplary embodiment of the present invention. The system 300 employs a system controller 301 which couples at least the welding power supply 101 with the laser power supply 108 so that the operation of these components can be synchronized. Such an embodiment can allow for the easy synchronization of these components during start-up, welding and stopping. Furthermore, the controller 301 can allow for adjustments of either or both of the laser power supply 108 or welding power supply 101 during a welding operation. That is, the controller 301 can direct the laser power supply 108 to provide a first power density for the laser beam for a first region of the weld and then a second power density (which is different) for a second region of the weld. Of course, the power density can remain the same but the size of the ablation area or zone can be changed as needed. Similarly he ablation pattern can change also from a first region to a second region of the weld joint, as needed. For example, a weld joint to be welded may have varying parameters during a single welding operation. Thus, the controller 301 can control the laser and welding operation appropriately. For example, it may be desirable to turn off the laser, or change the laser's energy level or beam shape, during welding. The controller 301 will allow these changes to occur during welding. Further, in some exemplary embodiments the laser 109 can be moved or oscillated by a motor 303 during welding as desired. Similarly, the optics of the laser 109 can be changed by an optics controller 305 during welding. This increases the flexibility of the system 300 and allows a complex weld joint to be welded in a single welding operation. For example, rather than using two beams to ablate at least two welding surfaces, the laser can be oscillated back-and-forth at a sufficient rate such that single beam 111 can sufficiently ablate multiple surfaces. Similarly, the optics of the laser can be controlled to change the shape of the beam 111 or beam density during welding.

It should be noted that although the controller 301 is depicted as a separate component in FIG. 8, the controller can be made integral to any of the welding power supply 101 or laser power supply 108 (as well as being a separate component).

In another exemplary embodiment, a temperature sensor 307 is positioned to sense the temperature of the surface of the work piece W at a point between the beam impact area and the arc welding operation. The sensor 307 is coupled to the controller 301 so that the controller 301 can monitor the temperature of the surface of the work piece W to ensure that the work piece is not being overheated during the ablation process. Thus, if the surface temperature is too high, the controller 301 will adjust the laser power supply 108 to reduce the energy/power density of the beam 111. This will prevent overheating or premature melting of the work piece.

In another exemplary embodiment, the sensor 307 shown in FIG. 8 can be a spectral sensor which is capable of determining the coating (such as zinc, paint, etc.) has been removed. Such spectral sensors can include laser induced plasma spectroscopy sensors or laser induced breakdown spectroscopy sensors. For example, the sensor 307 can be a spectral sensor that uses light or a laser beam to detect the presence of a material. In embodiments of the present invention, the sensor 307 can be calibrated to sense for the underlying base material, such as steel, to ensure that the coating is being sufficiently ablated. To the extent that it is detected that insufficient coating ablation is occurring the system, via the controller 301, can adjust the ablation appropriately. Further, the sensor 307 can also detect the spectral lines from the ablation plume to determine that the ablation plume (from the removal of the coating) is appropriate.

It should also be noted that although FIG. 8 depicts the cleaning and welding operation occurring simultaneously on a work piece W, embodiments are not limited to this. Specifically, in other exemplary embodiments of the present invention, the systems 200, 300 or 500 can be implemented where the cleaning operation is separated from the welding operation, but yet still be controlled as depicted. That is, it is contemplated that the cleaning operation occurs at a first station of a work cell, and the work piece(s) is transferred to a second station of a work cell (either robotically or manually) where the welding operation occurs. In fact, in the system 300 the system controller 301 can coordinate the transfer of the cleaned work piece from the first station to a second station.

FIG. 9 depicts an integral welding head which can be used with exemplary embodiments of the present invention. In this embodiment the weld head 600 comprises a housing structure 601 which couples and contains the welding contact tip 105 and at least a portion of the laser 109 to direct the beam 111 to the work piece W. Such a housing 601 fixes the distance Z between the beam and the welding arc and can be used to simplify the welding operation. In some embodiments, the housing 601 also contains the vapor extraction nozzle 203 to facilitate the removal of any vaporized coatings. Not shown is a shielding gas nozzle or welding fume extraction nozzle which can also be coupled to the housing 601. In other embodiment, the temperature sensor 307 can also be coupled to the housing 601 and positioned such that it senses the surface of the work piece W between the beam 111 and the arc welding. The housing 601 can have a structure or configuration as needed for a specific welding operation. For example, the housing 601 can have a shielding (not shown) which protects the beam 111 and welding arc from external influences and contamination, where the shielding extends to very near the surface of the work piece. Further, the housing 601 can have a physical divider 603 between the arc and the beam 111 to prevent any contamination and prevent any vapor extraction from inadvertently removing shielding gas from the arc welding operation. The divider 603 can extend to very near the surface of the work piece.

It should be noted that the lap joint welds depicted in the present application are intended to be exemplary as embodiments of the present invention can be used to weld many different types of weld joints. There are many different types of weld joints which can lead to the capture of vaporized coatings in the weld bead, and embodiments of the present invention can be adapted and employed for those types of weld joints as well.

While the invention has been particularly shown and described with reference to exemplary embodiments thereof, the invention is not limited to these embodiments. It will be understood by those of ordinary skill in the art that various changes in form and details may be made therein without departing from the spirit and scope of the invention as defined by the following claims.

What is claimed is:

1. A method of welding, comprising:
    directing a high energy beam to a coated surface of a work piece to be welded, where said coated surface has a coating with a different composition than said work piece;
    ablating at least a portion of said coating with said high energy beam to remove at least some of said coating, wherein said ablation does not substantially melt said work piece;
    welding said work piece with an arc welding process such that a weld joint created by said arc welding process has a cross-sectional porosity in the range of 0 to 30%, a length porosity in the range of 0 to 30% and a spatter factor in the range of 0 to 3, where spatter factor is the ratio of weld spatter weight in mg over consumed filler metal weight in kg for a length of said weld joint.

2. The method of claim 1, wherein said high energy beam is a laser beam having a power density of at least $10^5$ W/cm$^2$ and has an interaction time of no more than 5 ms during said ablation step.

3. The method of claim 1, wherein each of said cross-sectional and length porosity are in the range of 0 to 10% and said spatter factor is in the range of 0 to 1.

4. The method of claim 1, wherein said coating is zinc.

5. The method of claim 1, wherein said ablating step removes up to 75% of the thickness of said coating.

6. The method of claim 1, wherein said ablating occurs in an ablation area on said coated surface such that after said ablating step a first area of said ablation area has a first coating thickness which is greater than a second coating thickness of a second area of said ablation area.

7. The method of claim 6, wherein in said second area all of said coating is removed during said ablating step.

8. The method of claim 6, wherein said second area is at least 40% of said ablation area.

9. The method of claim 6, wherein said second area is at least 65% of said ablation area.

10. The method of claim 1, wherein said ablating occurs in an ablation area on said coated surface such that an ablation pattern is created in said coating where said pattern has peaks and troughs such that said peaks have a larger coating thickness than said troughs.

11. The method of claim 9, wherein all of said troughs in said ablation area are oriented to intersect with an edge of said work piece so as to allow vaporized coating from said ablating step to be directed away from said weld joint during said welding step.

12. The method of claim 1, wherein said high energy beam is directed at said coated surface upstream of said welding step in a welding process by a distance in the range of 0.5 to 6 inches.

13. The method of claim 1, wherein at least one of a power density of said high energy beam, a size of said high energy beam, and an ablation pattern created by said high energy beam changes from a first property to a second property to change a parameter of said ablating step during said welding of said work piece.

14. The method of claim 1, further comprising monitoring said surface after said ablating step and adjusting at least one of a power density or size of said high energy beam based on said monitoring.

15. The method of claim 14, wherein a temperature of said surface is monitored during said monitoring step.

16. The method of claim 14, wherein a second coated surface of a second work piece is also ablated by said high energy beam during said ablating step.

17. A method of welding, comprising:
    directing a high energy beam to a coated surface of a work piece to be welded, where said coated surface has a coating with a different composition than said work piece;
    changing a chemical composition of at least a portion of said coating with said high energy beam, wherein said high energy beam does not substantially melt said work piece;

welding said work piece with an arc welding process such that a weld joint created by said arc welding process has a cross-sectional porosity in the range of 0 to 30%, a length porosity in the range of 0 to 30% and a spatter factor in the range of 0 to 3, where spatter factor is the ratio of weld spatter weight in mg over consumed filler metal weight in kg for a length of said weld joint.

18. The method of claim 17, wherein said coating is paint and hydrocarbons of said paint are removed from said paint during said changing step to change said chemical composition of said paint.

19. A welding system, comprising:

an arc welding power supply coupled to an arc welding torch for performing an arc welding operation on a coated work piece to create a weld joint; and a high energy beam power supply coupled to a high energy beam source which directs a high energy beam at a coated surface of said work piece, wherein said high energy beam is directed at said coated surface upstream of said arc welding torch;

wherein said high energy beam has an energy density sufficient to remove at least a portion of said coating from said work piece but does not substantially melt said work piece; and wherein said arc welding power supply provides a weld joint having a cross-sectional porosity in the range of 0 to 30%, a length porosity in the range of 0 to 30% and a spatter factor in the range of 0 to 3, where spatter factor is the ratio of weld spatter weight in mg over consumed filler metal weight in kg for a length of said weld joint.

20. The system of claim 19, further comprising a system controller which controls the operation of said high energy beam power supply such that said high energy beam creates a first region and second region in an ablation area, where a thickness of said coating in said first region is greater than a thickness of said coating in said second region.

* * * * *